US008459008B2

(12) United States Patent
Kamiya et al.

(10) Patent No.: US 8,459,008 B2
(45) Date of Patent: Jun. 11, 2013

(54) WORKING MACHINE

(75) Inventors: Shohei Kamiya, Kasumigaura (JP); Kensuke Sato, Ushiku (JP); Hidenobu Tsukada, Ushiku (JP); Kazuhiro Shibamori, Joso (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 247 days.

(21) Appl. No.: 12/821,550

(22) Filed: Jun. 23, 2010

(65) Prior Publication Data

US 2011/0000197 A1    Jan. 6, 2011

(30) Foreign Application Priority Data

Jul. 2, 2009 (JP) ................. 2009-157973

(51) Int. Cl.
*F01N 3/02* (2006.01)
*F02D 45/00* (2006.01)
*F02D 29/00* (2006.01)
*B01D 46/42* (2006.01)

(52) U.S. Cl.
USPC .............................. 60/285; 60/295

(58) Field of Classification Search
USPC ................... 60/285, 295, 297, 301
See application file for complete search history.

(56) References Cited

U.S. PATENT DOCUMENTS

| 6,013,599 | A  | * | 1/2000 | Manson ................. 502/340 |
| 7,024,851 | B2 | * | 4/2006 | Akagi et al. ............. 60/285 |
| 2005/0155345 | A1 | | 7/2005 | Nakamura |
| 2010/0170227 | A1 | * | 7/2010 | Tsukada et al. ......... 60/286 |

FOREIGN PATENT DOCUMENTS

| EP | 0 321 451 A2 | 6/1989 |
| EP | 0 945 600 A1 | 9/1999 |
| EP | 1 942 263 A1 | 7/2008 |
| EP | 2 034 143 A1 | 3/2009 |
| JP | 2005-282478 A | 10/2005 |
| JP | 2009-138689 A | 6/2009 |
| WO | WO2009/060719 | * 5/2009 |

* cited by examiner

*Primary Examiner* — Thomas Denion
*Assistant Examiner* — Dapinder Singh
(74) *Attorney, Agent, or Firm* — Mattingly & Malur, P.C.

(57) ABSTRACT

An exhaust gas treatment filter removes particulate matter from exhaust gas of a diesel engine. The particulate matter which accumulates on the filter is removed by a manual regeneration system that can simply be controlled.
After a manual regeneration switch 22 is shifted to an ON-position, a load control section 66 keeps at least one of the revolution speed N of an engine 1, the displacement volume q and discharge pressure P of a hydraulic pressure pump 11 at a corresponding first target value (N1, q1, or P1) or second target value (N2, q2, or P2) depending on a temperature of the cooling water in relation to a flame-out prevention temperature T1. A regeneration control section 67 starts the compulsory regeneration after the manual regeneration switch has been shifted to the ON-position and when the cooling water temperature is equal to or higher than T1.

10 Claims, 6 Drawing Sheets

WORKING MACHINE

BACKGROUND OF THE INVENTION

1. Field of the Invention

The present invention relates to a working machine provided with a diesel engine, a variable displacement hydraulic pump, and exhaust gas treatment equipment.

2. Description of the Related Art

Some exhaust gas treatment equipment removes particulate matter (hereinafter, referred to as PM) from exhaust gas of a diesel engine. Such exhaust gas treatment equipment includes a diesel particulate filter or DPF (hereinafter, abbreviated as "the filter" in some cases). Since this type of exhaust gas treatment equipment has a problem with an increase in discharge pressure, which may occur when PM continuously is accumulated on the filter, it is necessary to remove the PM accumulated on the filter for regeneration of the filter.

The filter is regenerated mainly through self-regeneration or compulsory regeneration. The self-regeneration spontaneously occurs when exhaust temperature reaches a temperature at which PM burns (hereinafter, sometimes called "the regenerative temperature"). The compulsory regeneration is performed by burning unburned fuel contained in exhaust gas to compulsorily increase the exhaust temperature to a regenerative temperature. In addition, the compulsory regeneration includes a method (automatic regeneration) for automatically carrying out regeneration when a certain condition is met (e.g. when an estimated accumulated amount of PM exceeds a predetermined threshold level) and a method (manual regeneration) for carrying out regeneration at arbitrary timing based on operator's operation.

Incidentally, the compulsory regeneration includes a method for allowing exhaust gas to contain unburned fuel by use of multi-injection or post-injection in which fuel injection timing is more retarded than usual. For use of this method, however, if engine cooling-water temperature is low and so temperature in an engine cylinder is low, flame-out will occur, which may lead to a problem of deteriorating drivability or causing white smoke (hereinafter, sometimes abbreviated as "flame-out or the like").

To prevent the occurrence of flame-out or the like as mentioned above, JP-2005-282478-A describes that if cooling water temperature is lower than a temperature Tw0, which is set lest that the flame-out or the like occurs, then warm-up operation of the engine is continuously performed until the cooling-water temperature reaches the preset temperature Tw0, and compulsory regeneration is then started.

SUMMARY OF THE INVENTION

The above-mentioned patent document describes the following. First, a cooling water temperature is increased to a preset temperature Tw0 or higher and warming-up operation is completed. Then, exhaust temperature is increased to regenerative temperature, at which compulsory regeneration is carried out. In addition, when the cooling-water temperature is increased to Tw0 or higher, "a warm-up system" is operated. However, the above-mentioned patent document does not clearly describe the fact that the warm-up system is preferably configured by what hardware and the fact that the exhaust temperature is preferably increased by what method using the hardware. Further, the patent document does not clearly describe the fact that a manual regeneration system is preferably constructed from what viewpoint in a case where a filter mounted to a working machine (a hydraulic excavator (a construction machine), etc.) including a hydraulic pump is manually regenerated.

For example, if cooling-water temperature rise control using the warm-up system is complicated, it is probable that the reliability of the overall manual regeneration system deteriorates, depending on a balance with subsequent exhaust temperature rise control. Thus, it is difficult in some cases to install such a warm-up system in a real machine. The warm-up system may be construed as exhibiting a general method in which cooling-water temperature is left until it reaches T1 or higher in a low-idle state (in which an engine is continuously operated in an unloaded state and at minimum revolution speed). In such a case, if time is taken to complete warm-up because of low cooling-water temperature (particularly, in cold weather), it is probable that work efficiency of a working machine lowers. In other words, from a viewpoint of installing the warm-up system in a real machine, there is room for pursuing a manual regeneration system that can simply be controlled and can be warmed up within a short period of time in consideration of a series of flow to be followed for manual regeneration of a filter attached to a working machine.

The prevent invention can provide a working machine provided with a manual regeneration system that can simply be controlled and enables warm-up in a short time.

To achieve the above object, an aspect of the invention provides a working machine including: a diesel engine; a variable displacement hydraulic pump driven by the diesel engine; exhaust gas treatment equipment having a filter capturing particulate matter in the exhaust gas of the engine; cooling water temperature detecting means for detecting cooling water temperature of the engine; load control means for increasing at least one of revolution speed N of the engine, displacement volume q and discharge pressure P of the hydraulic pump from a state at low-idle time to increase an engine load; regeneration control means for compulsorily regenerating the filter by allowing fuel to stay in the exhaust gas of the engine to compulsorily elevate exhaust temperature; and regeneration instruction means for instructing the regeneration control means to start the compulsory regeneration. In the working machine, (A) after the instruction is given by the regeneration instruction means to start the compulsory regeneration and when the cooling water temperature is lower than flame-out prevention temperature T1 set to prevent occurrence of flame-out during the compulsory regeneration, the load control means keeps at least one of the revolution speed N of the engine, the displacement volume q and discharge pressure P of the hydraulic pressure pump at a corresponding first target value (N1, q1, or P1) set to allow the cooling water temperature to reach the flame-out prevention temperature T1 or higher, and (B) after the instruction is given by the regeneration instruction means to start the compulsory regeneration and when the cooling water temperature is equal to or higher than the flame-out prevention temperature T1, the load control means keeps at least one of the revolution speed N of the engine, the displacement volume q and discharge pressure P of the hydraulic pressure pump at a corresponding second target value (N2, q2, or P2) that is a target value set to keep exhaust temperature at which the compulsory regeneration is possible and that is set lower than the first target value. In addition, in the above case (B), the regeneration control means starts the compulsory regeneration after the instruction is given by the regeneration instruction means to start the compulsory regeneration and when the cooling water temperature is equal to or higher than the flame-out prevention temperature T1.

The present invention can perform warm-up in a short time by simple control in the manual regeneration of the working machine.

DESCRIPTION OF THE PREFERRED EMBODIMENTS

Embodiments of the present invention will hereinafter be described with reference to the drawings. A description is here given of a case where a manual regeneration system according to an embodiment of the invention is applied to a hydraulic excavator. A hydraulic excavator is one type of a working machine (hydraulic working machine) provided with a hydraulic pump driven by a diesel engine. The hydraulic excavator includes a lower travel structure having a crawler track body; an upper swing body swingably mounted to the lower travel structure; a multi-joint working device mounted to the front of the upper swing body; and a cabin mounted to the upper swing body.

Figure 1:
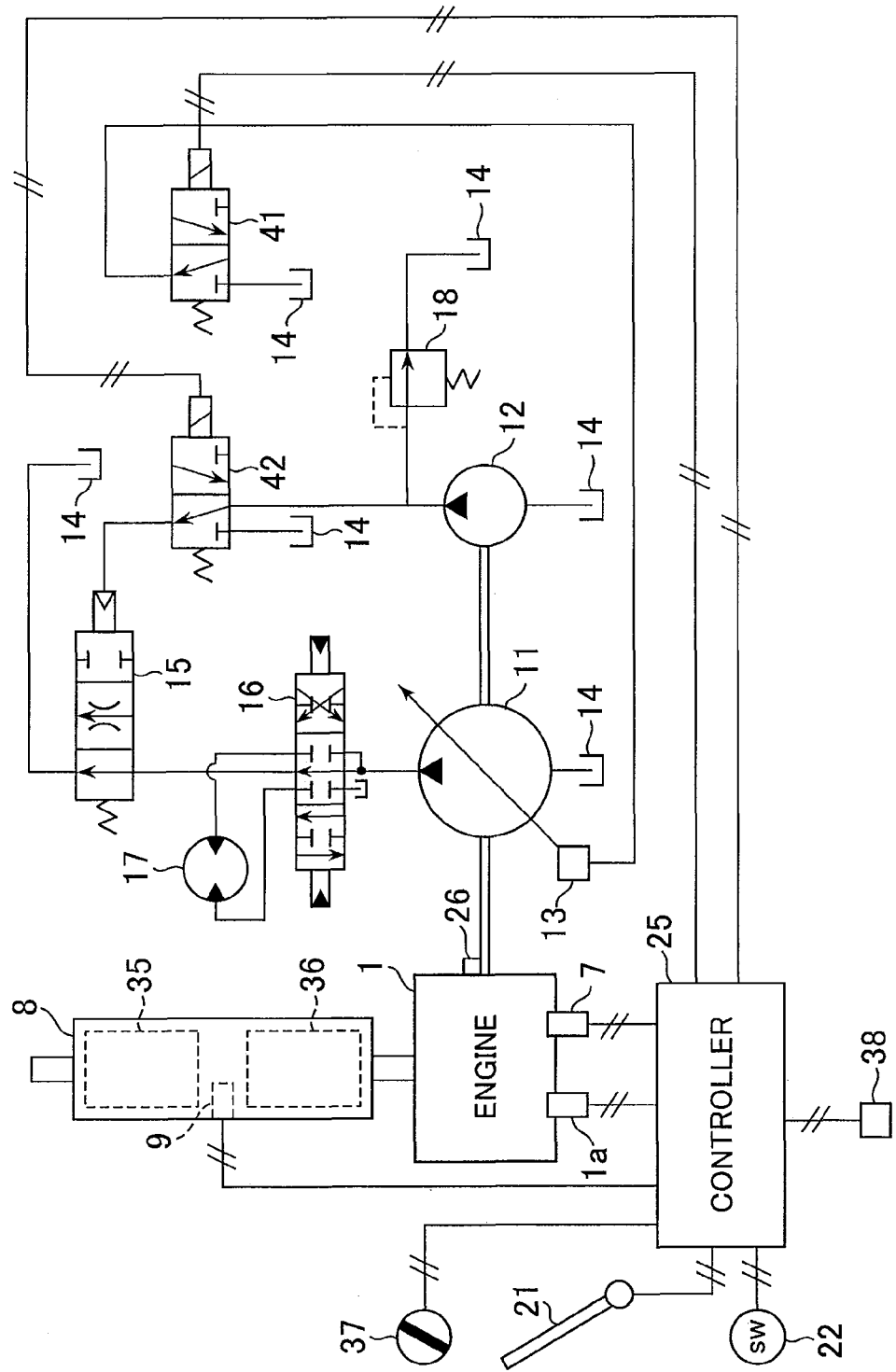
FIG. 1 is a schematic diagram of a working machine according to an embodiment of the present invention.

FIG. 1 is a schematic diagram of a working machine (hydraulic excavator) according to an embodiment of the present invention. The working machine illustrated in the figure includes a diesel engine (hereinafter, abbreviated as "the engine") 1, exhaust-gas treatment equipment 8, a variable displacement hydraulic pump (hereinafter, abbreviated as "the hydraulic pump") 11, a hydraulic actuator 17, a pilot pump 12, a gate lock lever (lock device) 21, a manual regeneration switch (regeneration indicating means) 22, and a controller (control unit) 25.

The engine 1 is a water-cooled diesel engine, which is cooled by cooling water (engine cooling water) delivered by a cooling water pump (not illustrated). The engine 1 is attached with a cooling water temperature sensor (cooling water temperature detecting means) 7 for detecting temperature (cooling water temperature) Tw of cooling water and with an engine revolution speed sensor (engine revolution speed detecting means) 26 for detecting revolution speed N of the engine 1. A detected value (cooling water temperature Tw) of the cooling water temperature sensor 7 and a detected value (actual revolution speed) of the revolution speed sensor 26 are sent to the controller 25.

The revolution speed N of the engine 1 is controlled via an engine control dial (engine revolution speed indicating means) 37. The engine control dial 37 is adapted to indicate target revolution speed of the engine 1 and is installed in a cabin of the working machine. The target revolution speed inputted via the engine control dial 37 is sent to the controller 25. The controller 25 controls the revolution speed N of the engine 1 by controlling a fuel injection device 1a (an electronically controlled fuel injection device) on the basis of the target revolution speed data sent from the engine controller dial 37 and the actual revolution speed data sent from the engine revolution speed sensor 26.

Figure 2:
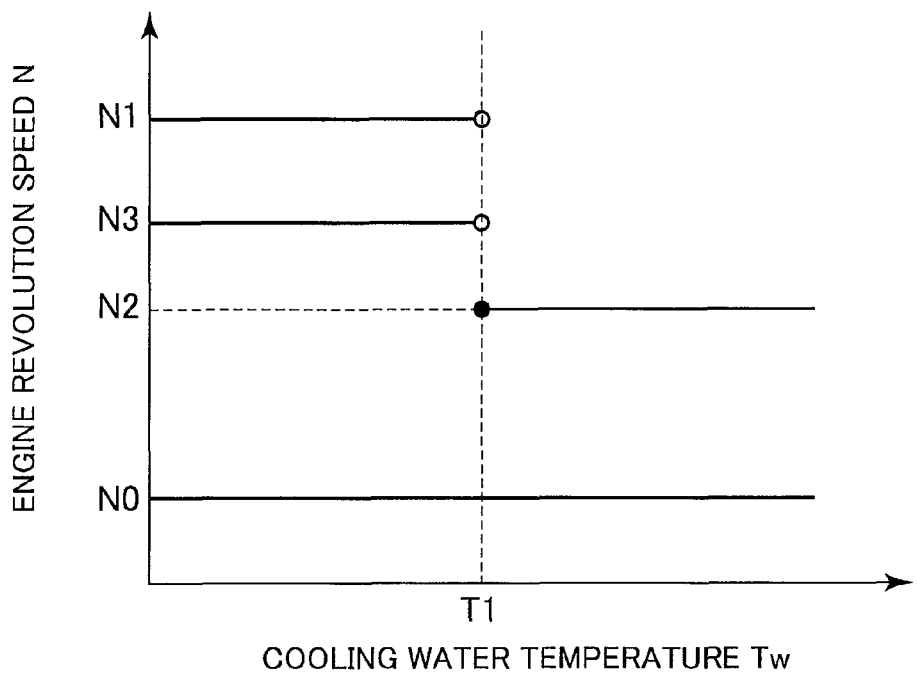
FIG. 2 is a characteristic diagram indicative of engine revolution speed N according to the embodiment of the present invention.

FIG. 2 is a characteristic diagram indicative of engine revolution speed N in the embodiment of the present invention. Referring to FIG. 2, the engine revolution speed N in the embodiment can be selectively set to any one of (1) first target value N1, (2) second target value N2, and (3) third target value N3 by manual regeneration processing described later. Symbol "N0" in this diagram indicates revolution speed at low-idle time (a state where the engine 1 is continuously operated at minimum revolution speed in an unloaded state). Such revolution speed hereinafter is called idle-time revolution speed N0 in some cases.

The first target value N1 is target revolution speed set to allow cooling water temperature Tw to reach flame-out prevention temperature T1 or higher which is set to prevent the occurrence of flame-out or the like during compulsory regeneration. In addition, the first target value N1 is set to a value higher than the idle-time revolution speed N0. As illustrated in FIG. 2, the first target value N1 can be set when the cooling water temperature Tw is lower than the flame-out prevention temperature T1.

The second target value N2 is target revolution speed set to keep exhaust temperature at regenerative temperature or higher (temperature at which the regeneration of a filter 35 (described later) is carried out, i.e., PM can be burned). In addition, the second target value N2 is set at a level higher than N0 and lower than the first target value N1. As illustrated in FIG. 2, the second target value N2 can be set when the cooling-water temperature Tw is equal to or higher than the flame-out prevention temperature T1.

The third target value N3 is target revolution speed set to allow the cooling-water temperature Tw to reach the flame-out prevention temperature T1 or higher when outside air temperature Ta is equal to or higher than preset temperature T2. The preset temperature T2 is set to suppress fuel consumption along with a load rise. The third target value N3 is set to a level lower than the first target value N1 and equal to or higher than the second target value N2 (i.e., N0<N2≦N3<N1). As illustrated in FIG. 2, the third target value N3 can be set in place of the first target value N1 when the cooling water temperature Tw is lower than the flame-out prevention temperature T1. When the revolution speed N of the engine 1 is set to N1, N2 or N3, an engine load is increased as compared with that at the low-idle time. Therefore, the cooling water temperature and the exhaust temperature can be increased in a short time as compared with the case where the revolution speed N of the engine 1 is left unchanged in the low-idle state. The engine load is increased with increased engine revolution speed N. Therefore, as the engine revolution speed N is increased, the cooling water temperature and the exhaust temperature can be increased in a shorter time.

The exhaust gas treatment equipment 8 is installed in an exhaust pipe through which the exhaust gas of the engine 1 passes. The exhaust gas treatment equipment 8 includes the filter (DPF) 35 capturing PM in the exhaust gas of the engine 1, an oxidation catalyst 36, and an exhaust temperature sensor (exhaust temperature detecting means) 9. The oxidation catalyst 36 is adapted to promote oxidation reaction (combustion) of unburned fuel contained in exhaust gas and disposed on the upstream side of the filter 35. The exhaust temperature sensor 9 detects temperature of exhaust gas of the engine 1 immediately before the exhaust gas is introduced to the filter 35 and is disposed between the filter 35 and the oxidation catalyst 36. The detected value (exhaust temperature) by the exhaust temperature sensor 9 is sent to the controller 25 and used to grasp whether or not the exhaust temperature reaches regenerative temperature.

The hydraulic pump 11 is a variable displacement pump driven by a hydraulic actuator (not illustrated) installed in the working machine and is driven by the engine 1. The tilting angle of a swash plate (not illustrated) of the hydraulic pump 11 is controlled by the regulator 13. By changing pressurized fluid acting on the regulator 13, the tilting angle is varied, with the result that the displacement volume (discharged flow rate per one rotation) q of the hydraulic pump 11 varies. The pressurized fluid pumped from a tank 14 by the pilot pump 12 is introduced into the regulator 13 via a first electromagnetic valve 41. The first electromagnetic valve 41 is connected to the controller 25. The throttle amount of the first electromagnetic valve 41 is adjusted by a control signal from the controller 25. In other words, the displacement volume q of the hydraulic pump 11 in the present embodiment is controlled via the first electromagnetic valve 41.

Figure 3:
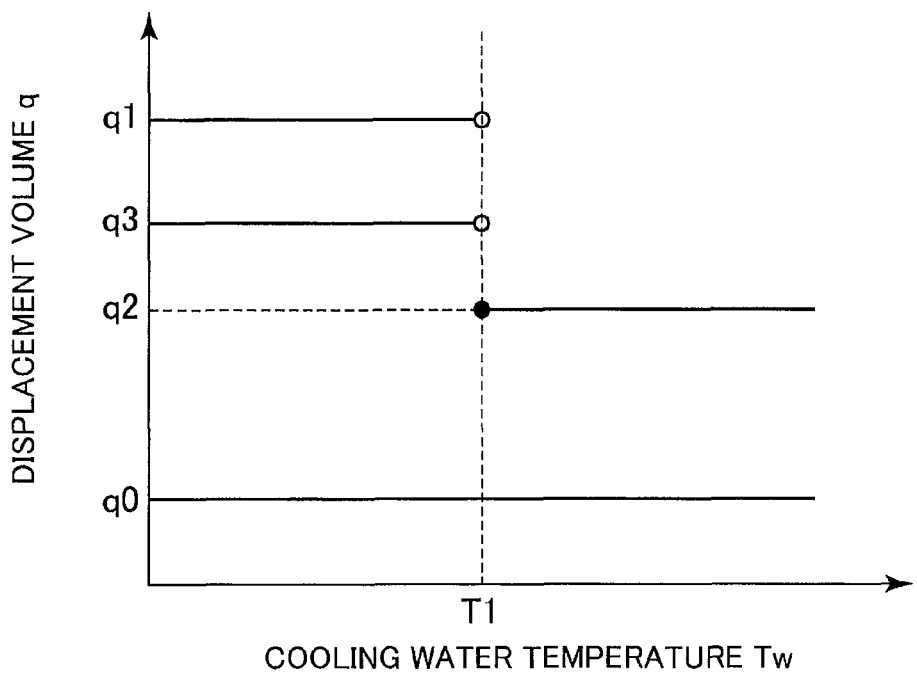
FIG. 3 is a characteristic diagram indicative of displacement volume of a hydraulic pump in the embodiment of the present invention.

FIG. 3 is a characteristic diagram indicative of the displacement volume q of the hydraulic pump 11 in the embodiment of the present invention. Referring to FIG. 3, the displacement volume q in the embodiment can be selectively set to any one of (1) first target value q1, (2) second target value q2 and (3) third target value q3 in manual regeneration processing described later. Symbol q0 in the diagram indicates displacement volume at low-idle time (hereinafter, sometimes called the idle-time volume q0).

The first target value q1 is target volume set to allow the cooling water temperature Tw to reach the flame-out prevention temperature T1 or higher and is set at a level higher than the idle-time volume q0. As illustrated in FIG. 3, the first target value q1 can be set when the cooling water temperature Tw is lower than the flame-out prevention temperature T1.

The second target value q2 is target volume set to keep exhaust temperature at regenerative temperature or higher and is set to a level higher than q0 and lower than the first target value q1. As illustrated in FIG. 3, the second target value q2 can be set when the cooling-water temperature Tw is equal to or higher than the flame-out prevention temperature T1.

The third target value q3 is target volume set to allow the cooling-water temperature Tw to reach the flame-out prevention temperature T1 or higher, when the outside temperature Ta is equal to or higher than the preset temperature T2. In addition, the third target value q3 is set to a level lower than the first target value q1 and equal to or higher than the second target value q2 (i.e., $q0<q2\leqq q3<q1$). As illustrated in FIG. 3, the third target value q3 is sometimes set in place of the first target value q1 when the cooling water temperature Tw is lower than the flame-out prevention temperature T1. When the tilting angle of the hydraulic pump 11 is varied to vary the displacement volume to q1, q2 or q3, the engine load is increased as compared with that at the low-idle time. Therefore, the cooling water temperature and the exhaust temperature can be increased in a short time as compared with the case where the displacement volume q is left unchanged in the low-idle state. The engine load is increased with increased displacement volume q. Therefore, as the displacement volume q is increased, the cooling water temperature and the exhaust temperature can be increased in a shorter time.

The pressurized fluid discharged from the hydraulic pump 11 is returned to the tank 14 via a flow control valve 16 and a variable throttle valve 15. The flow control valve 16 is adapted to control the drive of the hydraulic pressure actuator 17 and is shifted by pilot pressure given thereto via a control lever (not illustrated) installed in the cabin. When the flow control valve 16 is shifted from the neutral position, the hydraulic actuator 17 is driven by the pressurized fluid introduced thereto from the hydraulic pump 11. Incidentally, the hydraulic actuator 17 illustrated in FIG. 1 is a swing motor adapted to swing the upper swing structure. However, other hydraulic actuators (e.g. a boom cylinder turning a boom of the multi-joint working device) and flow control valves controlling the corresponding hydraulic actuators are omitted.

When the flow control valve 16 is at a neutral position (when not operated by the operator), the discharge pressure P of the hydraulic pump 11 is controlled by the variable throttle valve 15. In this case, the pressurized fluid acting on the variable throttle valve 15 is varied to vary the discharge pressure P of the hydraulic pump 11. Pressurized fluid discharged from the pilot pump 12 is introduced into the variable throttle valve 42 via a second electromagnetic valve 15. The second electromagnetic valve 42 is connected to the controller 25. The throttle amount of the second electromagnetic valve 42 is adjusted by the control signal from the controller 25. In other words, the discharge pressure P of the hydraulic pump 11 in the embodiment is controlled via the second electromagnetic valve 42.

Figure 4:
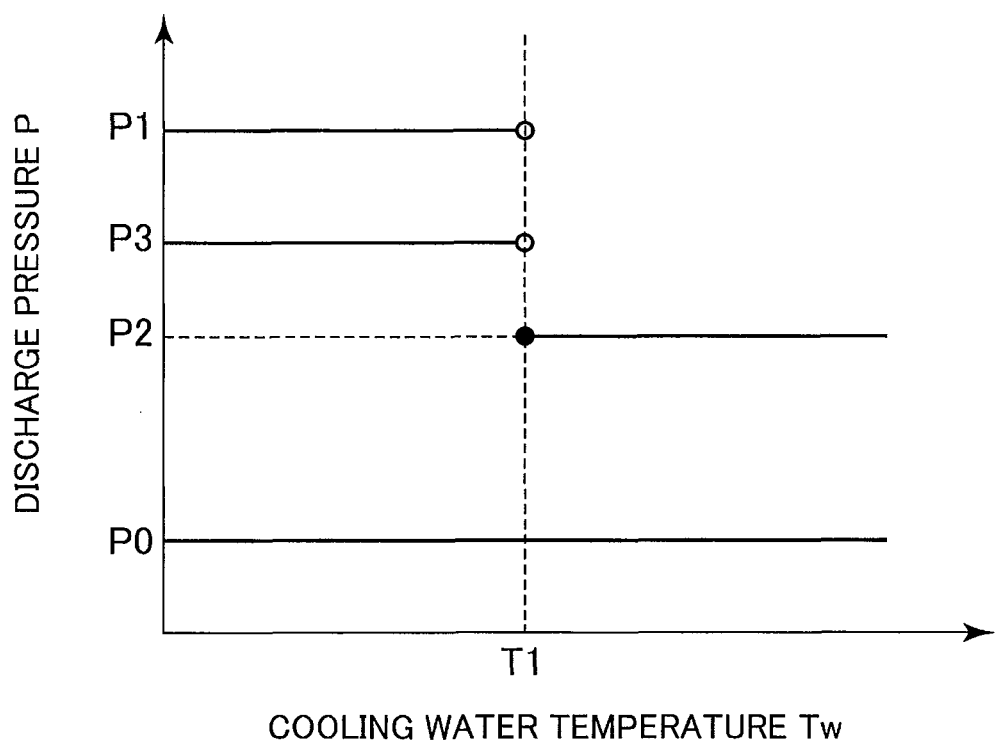
FIG. 4 is a characteristic diagram indicative of discharge pressure P of the hydraulic pump according to the embodiment of the present invention.

FIG. 4 is a characteristic diagram indicative of discharge pressure P of the hydraulic pump 11 in the embodiment of the invention. Referring to FIG. 4, the discharge pressure P in the present embodiment can be selectively set to any one of (1) first target value P1, (2) second target value P2 and (3) third target value P3 in manual regeneration processing described later. Symbol P0 in the figure indicates discharge pressure at low-idle time (hereinafter, sometimes called low-idle time pressure P0).

The first target value P1 is target pressure set to allow the cooling water temperature Tw to reach the flame-out prevention temperature T1 or higher and is set at a level higher than the idle-time volume q0. As illustrated in FIG. 4, the first target value P1 can be set when the cooling water temperature Tw is lower than the flame-out prevention temperature T1.

The second target value P2 is target pressure set to keep exhaust temperature at regenerative temperature or higher and is set to a level higher than P0 and lower than the first target value P1. As illustrated in FIG. 4, the second target value P2 can be set when the cooling water temperature Tw is equal to or higher than the flame-out prevention temperature T1.

The third target value P3 is target pressure set to allow the cooling water temperature Tw to reach the flame-out prevention temperature T1 or higher when the outside air temperature is equal to or higher than the preset temperature T2. In addition, the third target value P3 is set to a level lower than the first target value P1 and equal to or higher than the second target value P2 (i.e., $P0<P2\leqq P3<P1$). As illustrated in FIG. 4, the third target value P3 is sometimes set in place of the first target value P1 when the cooling water temperature Tw is lower than the flame-out prevention temperature T1. When the discharge pressure P of the hydraulic pump 11 is set to P1, P2 or P3, the engine load is increased as compared with that at the low-idle time. Therefore, the cooling water temperature and the exhaust temperature can be increased in a short time as compared with the case where the discharge pressure P is left unchanged in the low-idle state. The engine load is increased with increased discharge pressure P of the hydraulic pump 11. Therefore, as the discharge pressure P is increased, the cooling water temperature and the exhaust temperature can be increased in a shorter time.

The pilot pump 12 is driven by the engine 1 similarly to the hydraulic pump 11 to supply pressurized fluid to an operating system including the variable throttle valve 15 and the regulator 13. The pressurized fluid discharged from the pilot pump 12 is introduced into the electromagnetic valves 41 and 42. The maximum pressure of the pressurized fluid discharged from the pilot pump 12 is adjusted to a constant level by a pilot relief valve 18 installed closer to the tank 14 than to the electromagnetic valves 41 and 42. Incidentally, in the present embodiment, the discharge pressure P and displacement volume q (tilting angle) of the hydraulic pump 11 are controlled by operating the variable throttle valve 15 and the regulator 13 via the electromagnetic valves 41 and 42. However, the following may be acceptable. The variable throttle valve 15 and the regulator 13 are electronically connected to the controller 25. The discharge pressure P and displacement volume q (tilting angle) of the hydraulic pump 11 are controlled by directly sending control signals from the controller 25 to the variable throttle valve 15 and the regulator 13.

The gate lock lever 21 cuts off pilot pressure applied to the flow control valve 16, thereby making impossible operator's operation through a control lever (not illustrated). The gate lock lever 21 is installed in the cabin of the working machine. When the gate lock lever 21 is shifted to a lock position, the pilot pressure applied to the flow control valve 16 is cut off, which makes it impossible to operate the hydraulic actuator 17 via the control lever. On the other hand, when the gate lock lever 21 is shifted to a lock-release position, operation by the control lever becomes possible.

The manual regeneration switch (the regeneration indicating means) 22 is used by the operator of the working machine to direct the controller 25 to start the compulsory regeneration of the filter 35. The manual regeneration switch 22 is installed in the cabin of the working machine and connected to the controller 25. Examples of a case where the manual regeneration switch 22 is depressed by the operator include the following cases. In one case, the controller 25 gives an instruction via a display device installed in the cabin to execute compulsory regeneration. In another case, regeneration is executed by operator's intention at fixed intervals or at arbitrary time regardless of the previous case.

Figure 5:
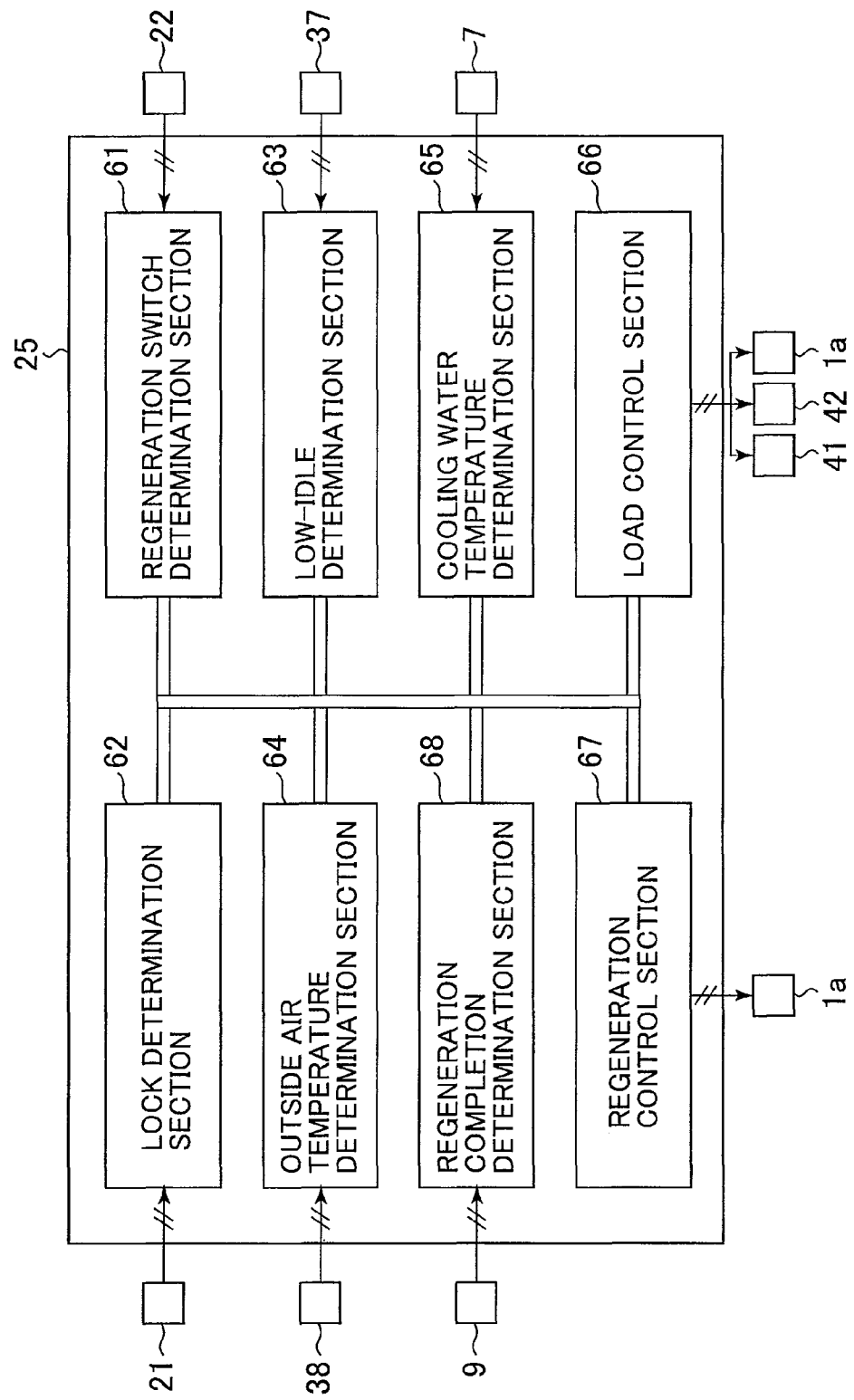
FIG. 5 is a schematic diagram of a controller 25 of the embodiment of the present invention.

FIG. 5 is a schematic diagram of the controller 25 according to the embodiment of the present invention. Incidentally, the same portions as in the previous drawings are denoted with like reference numerals and their explanations are omitted (which applies to the following drawings).

Referring to FIG. 5, the controller 25 includes a regeneration switch determination section 61, a lock determination section 62, a low-idle determination section 63, an outside air temperature determination section 64, a cooling water temperature determination section 65, a load control section 66, a regeneration control section 67, and a regeneration completion determination section 68. These sections are connected to one another for intercommunication.

The regeneration switch determination section 61 is a section that determines whether or not there has been an instruction from the operator via the manual regeneration switch 22 to start compulsory regeneration. The regeneration switch determination section 61 in the present embodiment is adapted to receive from the manual regeneration switch 22 an ON-signal transmitted when the manual regeneration switch 22 is at an ON-position. In this way, the regeneration switch determination section 61 determines the presence or absence of a compulsory regeneration request.

The lock determination section 62 is a section that determines whether or not the gate lock lever 21 is at the lock position, i.e., whether or not the operator's operation of the working machine is in an impossible state. The lock determination section 62 in the embodiment is adapted to receive from the gate lock lever 21 a lock signal transmitted when the gate lock lever 21 is at the lock position. In this way, the lock determination section 62 determines whether or not the gate lock lever 21 is at the lock position. When the lock determination section 62 can determine that the gate lock lever 21 is at the lock position, it can be seen that the working machine is at rest.

The low-idle determination section 63 is a section that determines whether or not the engine 1 is operating in a low-idle state. The low-idle determination section 63 in the embodiment is adapted to receive target revolution speed transmitted when the engine control dial 37 indicates low-idle revolution speed (low-idle). In this way, the low-idle determination section 63 determines whether or not the engine 1 is operating in the low-idle state. Incidentally, the low-idle determination section 63 may determine whether or not the engine 1 is operating in the low-idle state by detecting the fact that the detection value of the engine revolution speed sensor 26 is kept at around predetermined revolution speed as well as by making determination based on the position of the engine control dial 37 as described above.

The outside air temperature determination section 64 is a section that determines which is higher or lower between the preset temperature T2 set to suppress fuel consumption along with a load rise caused by the load control section 66 and outside air temperature Ta. The outside air temperature determination section 64 in the embodiment is connected to an outside air temperature sensor 38 installed in the working machine and is adapted to receive a detection value (outside air temperature Ta) by the outside air temperature sensor 38. In the manual regeneration processing described later, the load control section 66 can exercise load control in a first warm-up mode when the outside air temperature Ta is lower than T2. In addition, when the outside air temperature Ta is equal to or higher than T2, the load control section 66 can exercise load control in a second warm-up mode in which warm-up is executed at a lower load than in the first warm-up mode (details are described later).

The cooling water temperature determination section 65 is a section that determines which is higher or lower between the flame-out prevention temperature T1 and cooling water temperature Tw. The cooling water temperature determination section 65 in the embodiment is connected to the cooling water temperature sensor 7 and is adapted to receive the detection value (cooling water temperature Tw) by the cooling water temperature sensor 7.

The load control section (load control means) 66 is a section that controls an engine load to manually regenerate the filter 35. A method of increasing an engine load from a condition at the low-idle time includes a method of increasing at least one of the revolution speed N of the engine 1, the displacement volume q and discharge pressure P of the hydraulic pump 11 from the condition at the low-idle time. In the manual regeneration processing described later, the load control section 66 in the embodiment appropriately sends a control signal to the fuel injection device 1a, the regulator 13 or the variable throttle valve 15 to control engine revolution speed N, the displacement volume q or discharge pressure P of the hydraulic pump 11, respectively. In this way, the load control section 66 controls the engine load. Specifically, in the manual regeneration processing described above, any one of three load control modes, i.e., a first warm-up mode (1), a second warm-up mode (2) and an exhaust gas temperature rise mode (3), is implemented.

Each of the first warm-up mode (1) and the second warm-up mode (2) is load control exercised to allow the cooling water temperature Tw to reach the flame-out prevention temperature T1 in a short time. The exhaust temperature rise mode (3) is load control exercised to keep exhaust temperature at regenerative temperature after the cooling water temperature Tw has been allowed to reach T1. The first warm-up mode (1) is such that at least one of the revolution speed N of the engine 1, the displacement volume q and discharge pressure P of the hydraulic pump 11 is kept at the corresponding first target value (N1, q1, or P1). The second warm-up mode (2) is such that at least one of the revolution speed N of the engine 1, the displacement volume q and discharge pressure P of the hydraulic pump 11 is kept at the corresponding third target value (N3, q3, or P3). The exhaust temperature rise mode (3) is such that at least one of the revolution speed N of the engine 1, the displacement volume q and discharge pressure P of the hydraulic pump 11 is kept at the corresponding second target value (N2, q2, or P2). As described earlier, these target values have magnitude relationship: the second target value (N2, q2, P2)≦the third target value (N3, q3, P3)<the first target value (N1, q1, P1). Thus, the degree of the engine load rise has magnitude relationship established as "the exhaust temperature rise mode (3)≦the second warm-up mode (2)<the first warm-up mode (1)".

The regeneration control section (regeneration control means) 67 is a section that controls compulsory regeneration (manual regeneration) of the filter 35. The regeneration control section 67 allows fuel to stay in the exhaust gas of the engine 1 to compulsorily elevate exhaust temperature for compulsory regeneration of the filter 35. The regeneration control section 67 in the present embodiment sends a control signal to the fuel injection device 1a and allows exhaust gas to contain unburned fuel by use of multi-injection or post-injection in which fuel injection timing is more retarded than usual. Incidentally, in a case such that unburned fuel is supplied by use of multi-injection and the unburned fuel necessary for compulsory regeneration may be insufficient only by use of the multi-injection, it may be acceptable that a fuel supply device is additionally installed in an exhaust pipe extending from the outlet of the engine 1 to the exhaust treatment device 8 so as to supply the amount of the insufficient unburned fuel to exhaust gas.

The regeneration completion determination section 68 is a section that determines whether or not the compulsory regeneration of the filter 35 is completed. The regeneration completion determination section 68 in the embodiment is connected to the exhaust temperature sensor 9 and determines the completion of the regeneration by use of the detection value by the exhaust temperature sensor 9. Specifically, the regeneration completion determination section 68 measures time during which the exhaust temperature detected by the exhaust temperature sensor 9 is kept in a compulsorily regenerable range (i.e., temperature higher than regenerative temperature). When the measured time reaches regeneration completion time (time set to determine regeneration completion timing of the filter 35), the regeneration completion determination section 68 determines that the regeneration of the filter 35 is completed. Incidentally, when the completion of the regeneration is determined in this way, a section (regeneration time measurement means) adapted to measure time during which exhaust temperature is kept in the regenerable range may separately be installed in the controller 25. Alternatively, a differential pressure sensor (differential pressure detection means) for detecting differential pressure between front and rear of the filter 35 may be installed in addition to the use of the exhaust temperature sensor 9 as described above. In this case, the time when the detection value by such a sensor drops to a level equal to or below a preset value may be considered as the time when the regeneration is completed.

Figure 6:
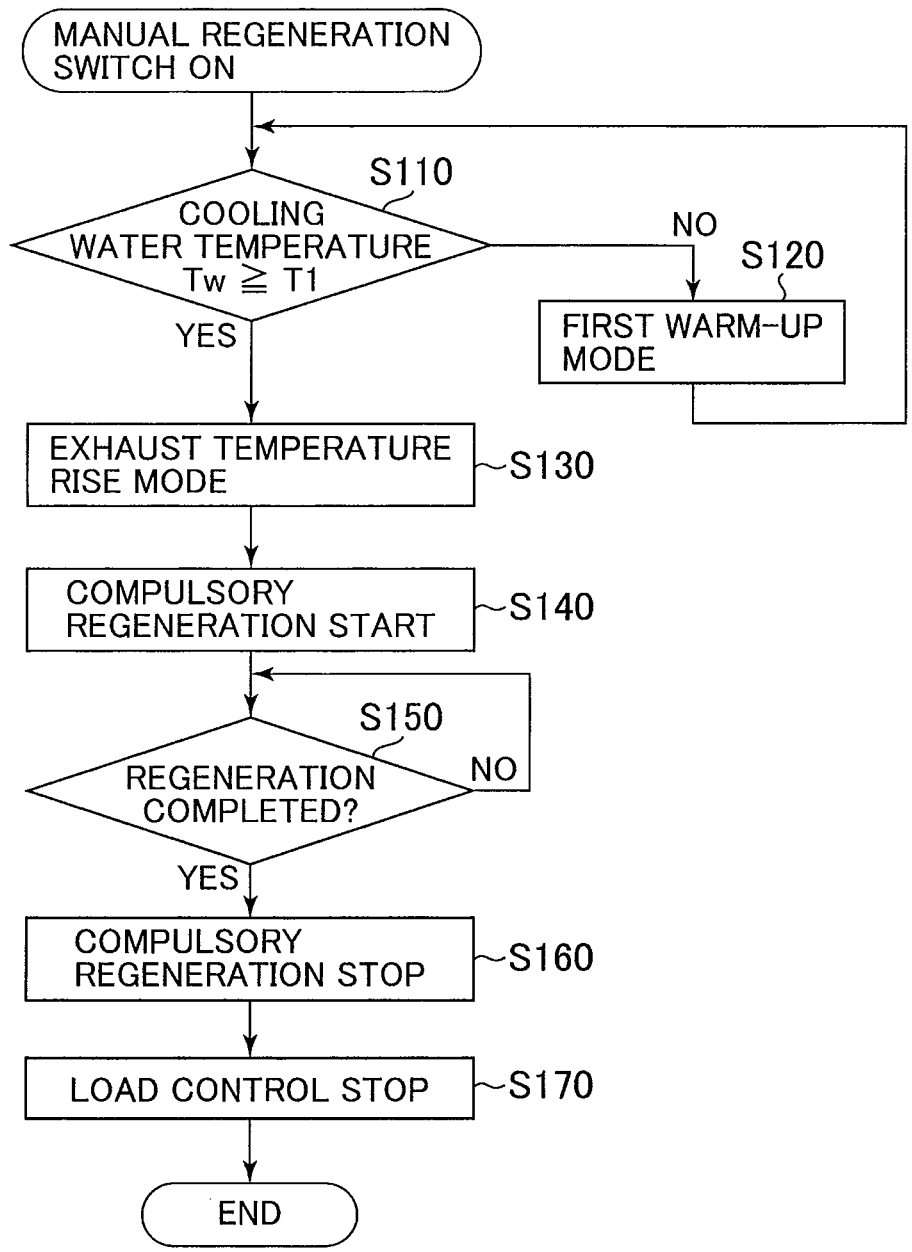
FIG. 6 is a flowchart for first manual regeneration processing in the working machine according to the embodiment of the present invention.

A description is next given of first manual regeneration processing for the working machine configured as described above. FIG. 6 is a flowchart of the first manual regeneration processing for the working machine in the embodiment of the present invention.

Referring to FIG. 6, the regeneration switch determination section 61 makes a determination that the manual regeneration switch 22 has been shifted from the OFF-position to the ON-position. In addition, when the regeneration switch determination section 61 confirms that the operator has instructed the start of compulsory regeneration, the controller 25 starts manual regeneration processing. The cooling water temperature determination section 65 determines whether or not the cooling water temperature Tw sent from the cooling water temperature sensor 7 is equal to or higher than the flame-out prevention temperature T1 (S110).

In step S110, when the cooling water temperature Tw is lower than T1, the load control section 66 exercises engine load control in the first warm-up mode until the cooling water temperature Tw reaches T1. Specifically, the load control section 66 keeps at least one of the revolution speed N of the engine 1, the displacement volume q and discharge pressure S of the hydraulic pump 11 at the corresponding first target value (N1, q1, or P1). This increases an engine load (S120). The exercise of the engine load control as described above increases the engine load as compared with that at the low-idle time. Therefore, as compared with the case where the engine load is left unchanged in the low-idle state, the cooling water temperature Tw can be allowed to reach T1 in a short time. Thus, flame-out or the like during the compulsory regeneration can be prevented from occurring in a short time. Preferably, the first target value (N1, q1, or P1) in the first warm-up mode is set so that exhaust temperature encountered when the cooling water temperature Tw reaches T1 may already reach the regenerative temperature or higher. This is because of the following. If the first target value is set as above, the regeneration of the filter 35 is instantly started in subsequent compulsory regeneration processing (S140). Thus, wasteful fuel consumption can be suppressed.

The cooling water temperature determination section 65 may determine that the cooling water temperature Tw reaches T1 or higher in step S120 and that the cooling water temperature Tw reaches T1 or higher in step S110. In such cases, the load control section 66 exercises engine load control in the exhaust temperature rise mode (S130). Specifically, the load control section 66 keeps at least one of the revolution speed N of the engine 1, the displacement volume q and discharge pressure P of the hydraulic pump 11 at the corresponding second target value (N2, q2, or P2). The regeneration control section 67 allows unburned fuel to stay in the exhaust gas and starts compulsory regeneration (S140). Because the unburned fuel stays in exhaust gas as described above while keeping the exhaust temperature, the unburned fuel is oxidized by the oxidation catalyst 36. Thus, exhaust gas to be introduced into the filter 35 can be elevated by its reaction heat to regenerative temperature or higher. In this way, PM captured by the filter 35 can be burned to reduce an amount of PM accumulated on the filter 35. Incidentally, FIG. 6 illustrates that step S140 is started after step S130; however, steps S130 and 5140 may be started at the same time.

The compulsory regeneration is started in step S140. Thereafter, the regeneration control section 67 continues the compulsory regeneration until the regeneration completion determination section 68 determines the completion of the compulsory regeneration, while the load control section 66 maintains the exhaust temperature rise mode (S150). Specifically, in the embodiment, it may be confirmed that accumulated time during which exhaust temperature detected by the exhaust temperature sensor 9 is kept at regenerative temperature or higher reaches regeneration completion time. In such a case, the regeneration completion determination section 68 determines that the regeneration of the filter 35 is completed. After the regeneration completion determination section 68 has determined that the regeneration of the filter 35 is completed as described above, the regeneration control section 67 stops the compulsory regeneration (S160), the load control section 66 stops the load control (S170) and the controller 25 ends the load control flow.

As clear from the above description, the working machine of the embodiment includes: the cooling water temperature sensor 7 for detecting cooling water temperature Tw; the load control section 66 for increasing at least one of the revolution speed N of the engine 1, the displacement volume q and discharge pressure P of the hydraulic pump 11 from the corresponding state at the low-idle time to increase engine load; the regeneration control section 67 for allowing fuel to stay in the exhaust gas of the engine 1 to compulsorily elevate exhaust temperature for compulsory regeneration of the filter 35; and the manual regeneration switch 22 for giving an instruction to the regeneration control section 67 to start the compulsory regeneration. As clear from the first manual regeneration processing described above, the load control section 66 exercises (A) the engine load control in the first warm-up mode when the cooling water temperature Tw is lower than T1 under the condition that the manual regeneration switch 22 has been shifted to the ON-position, and (B) the engine load control in the exhaust temperature rise mode when the cooling water temperature Tw is equal to or higher than T1 under the condition that the manual regeneration switch 22 has been shifted to the ON-position. On the other hand, the regeneration control section 67 starts the compulsory regeneration when the cooling water temperature Tw is equal to or higher than T1 under the condition that the manual regeneration switch 22 has been shifted to the ON-position.

According to the working machine configured as above, even if the cooling water temperature Tw is lower than T1 when the operator intends to execute the manual regeneration, the engine load control is exercised in the first warm-up mode, thereby preventing the occurrence of flame-out or the like in a short time. Therefore, the period of time it takes from the shifting of the manual regeneration switch 22 to the ON-position to the actual start of the compulsory regeneration (the period of time from the start of the processing to step S140 in FIG. 6) can be shortened. Thus, it is possible to prevent the working efficiency of the working machine from being reduced. Further, the working machine configured as above controls the common object (i.e., at least one of the revolution speed N of the engine 1, the displacement volume q and discharge pressure P of the hydraulic pump 11) in the warm-up mode for elevating the cooling water temperature Tw and in the exhaust temperature rise mode for keeping the exhaust temperature at the regenerative temperature or higher. Therefore, this control is simple as compared with the case where objects different from each other are controlled in both the respective modes. As this prevents the system for exercising manual regeneration processing from being complicated as a whole, it is easy to mount the system in a real machine. Thus, the present embodiment can provide the working machine provided with the manual regeneration system in which control is simple and warm-up is possible in a short time.

In addition to the above-described configuration, the working machine in the embodiment described above is further provided with the regeneration completion determination section 68 for determining the completion of the compulsory regeneration of the filter 35. As illustrated in FIG. 6, when the regeneration completion determination section 68 determines the completion of the compulsory regeneration, the compulsory regeneration and the load control are stopped. The manual regeneration processing configured as above can complete the regeneration of the filter 35 without fail when the manual regeneration switch 22 is shifted to the ON-position.

Figure 7:
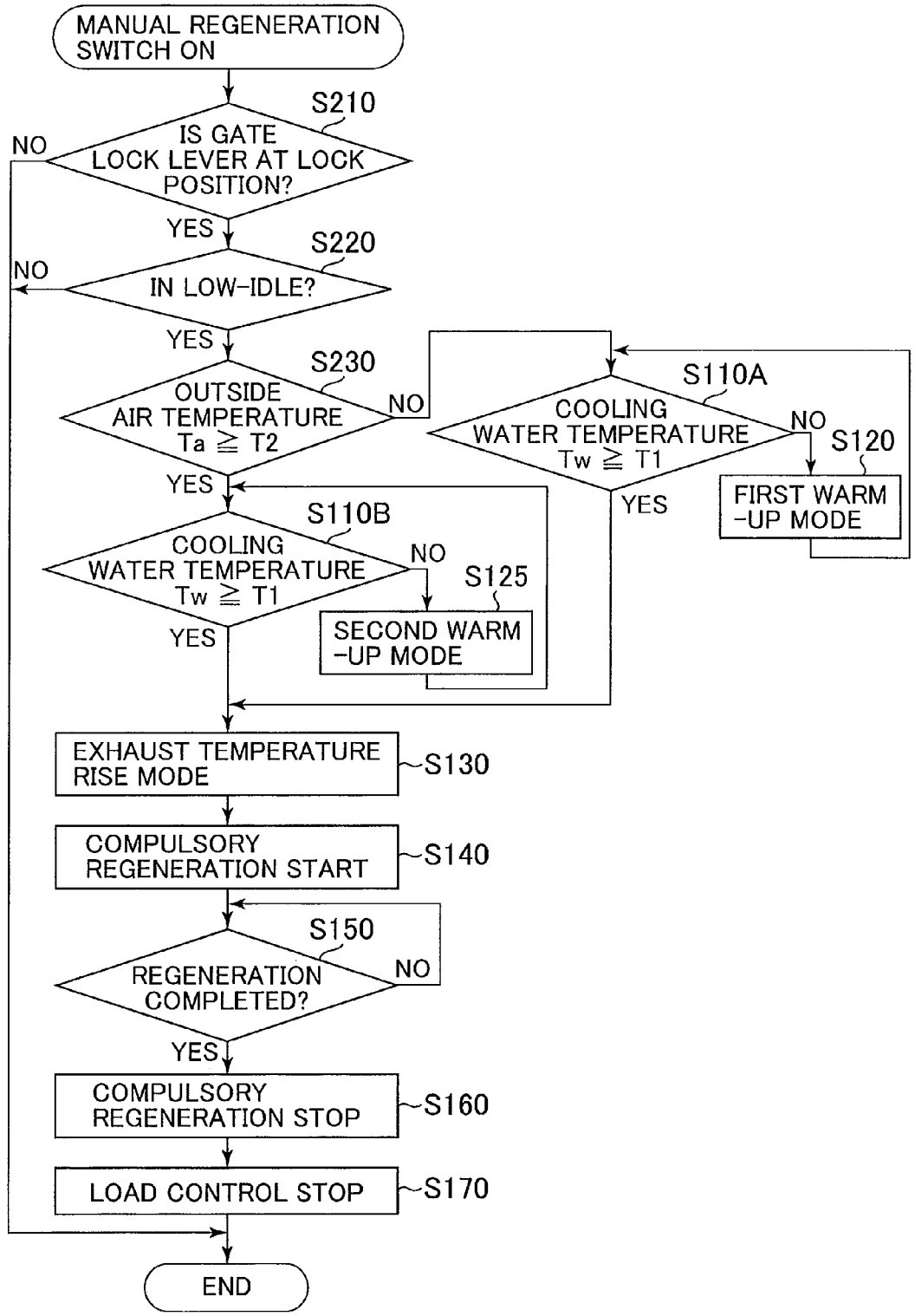
FIG. 7 is a flowchart for second manual regeneration processing in the working machine according to the embodiment of the present invention.

A description is next given of second manual regeneration processing for the working machine configured as described above. FIG. 7 is a flowchart of manual regeneration processing for the working machine according to the embodiment.

The flow of the manual regeneration processing illustrated in FIG. 7 is different from the first flow in the following points. (1) A determination is made as to whether or not the gate lock lever 21 is at the lock position (S210). (2) A determination is made as to whether or not the engine 1 is operating in the low-idle state (S220). (3) The warm-up mode is changed depending on outside sir temperature (S230, S110A, S120, S110B, and S125). The same processing as in the previous flow is denoted with like symbols in FIG. 7 and its explanation is omitted. The following describes differences from the previous flow and corresponding effects produced by such differences.

Referring to FIG. 7, the manual regeneration switch 22 is shifted to the ON-position to start the manual regeneration processing. The controller 25 allows the lock determination section 62 to determine whether or not the gate lock lever 21 is held at the lock position (S210). In step S210, when it is determined that the gate lock lever 21 is at the lock position, the controller 25 allows the low-idle determination section 63 to determine whether or not the engine 1 is operating in the low-idle state (S220). In step S220, when the engine control dial 37 indicates low-idle, the low-idle determination section 63 determines that the engine 1 is operating in the low-idle state. Then, the controller 25 proceeds to determination processing of outside air temperature Ta (S230).

On the other hand, when the gate lock lever 21 is at the lock-release position in step S210 mentioned above and the engine control dial 37 indicates other target revolution speed in step S220, it is determined that preconditions for compulsory regeneration are not met and the manual regeneration processing is ended. Incidentally, the following is preferable in such a case. A display device, a warning lamp or the like is installed in the cabin of the working machine. The fact that the manual regeneration is not started yet and its cause (the position of the gate lock lever 21 or of the engine control dial 37) are notified to the operator via the display device, the warning lamp or the like.

In step S230, the outside temperature determination section 64 determines whether or not the outside air temperature Ta sent from the outside air sensor 38 is equal to or higher than the preset temperature T2. When the outside air temperature Ta is equal to or higher than T2, the cooling water temperature determination section 65 determines whether or not the cooling water temperature Tw is equal to or higher than flame-out prevention temperature T1 (S110B).

In step S110B, when it is determined that the cooling water temperature Tw is lower than T1, the load control section 66 exercises engine load control in the second warm-up mode until the cooling water temperature Tw reaches T1. Specifically, the load control section 66 keeps at least one of the revolution speed N of the engine 1, the displacement volume q and discharge pressure P of the hydraulic pump 11 at the corresponding third target value (N3, q3, or P3) to increase the engine load (s125). When the outside air temperature Ta is equal to or higher than T2 as described above, the cooling temperature Tw may be increased by use of the second warm-up mode having a load lower than that of the first warm-up mode. In such a case, fuel necessary to allow the cooling water temperature Tw to reach T1 can be reduced as compared with the case in which the first warm-up mode is applied.

When the cooling water temperature determination section 65 determines that the cooling water temperature Tw reaches T1 in step S125 and is equal to or higher than T1 in step S125, control proceeds to the exhaust temperature rise mode (S130). In the following steps, the same processing as in the flow of FIG. 6 is performed and then control is ended.

On the other hand, when it is determined that the outside air temperature Ta is lower than T2 in step S230, the cooling water temperature determination section 65 determines whether or not the cooling water temperature Tw is equal to or higher than the flame-out prevention temperature T1 (S110A). The following processing is performed similarly to the flow of FIG. 6 and control is ended.

As clear from the above description, in the manual regeneration processing illustrated in FIG. 7, the manual regeneration processing is performed only when the gate lock lever 21 is at the lock position. As the manual regeneration processing is performed as described above, it can be prevented from being started in the state where the operator can operate the working device or the like. Therefore, it is possible to prevent load variation resulting from the operator's operation from occurring in the manual regeneration processing. Thus, the manual regeneration processing can be performed more stably than in the flow illustrated in FIG. 6. Incidentally, in the above, the determination of the position of the gate lock lover 21 is performed only at the time of starting the manual regeneration processing. However, preferably the position of the gate lock lever 21 is constantly monitored and when the gate lock lever 21 is shifted to the lock-release position, the manual regeneration processing is immediately ended. With this configuration, stable manual regeneration processing can consistently be performed until the completion of the regeneration processing. Incidentally, the working machine may be a working vehicle such as a wheel roader or the like provided with an accelerator pedal adapted to control the revolution speed and torque of the engine to control vehicle traveling speed. In such a case, preferably, a parking brake device which is vehicle stopping means during parking is operating in addition to the fact that the gate lock lever 21 is at the lock position, as a start condition and a continuity condition for the manual regeneration processing.

In the manual regeneration processing of FIG. 7, the manual regeneration processing is performed only when the engine 1 is operating in the low-idle state. As the manual regenerating processing is performed as described above, fuel consumption can be reduced during the manual regeneration processing. If the control is exercised in this way, when the manual regeneration processing is started, engine revolution speed is increased from the low-idle state. In addition, when the manual regeneration processing is ended, the engine revolution speed is returned to the low-speed state. Thus, based on the magnitude of the engine sound, the operator can recognize that the manual regeneration processing is in execution at the moment or is ended.

Further, in the manual generation of FIG. 7, in steps S230, S110A, S120, S110B and S125, the warm-up mode is changed depending on the outside air temperature Ta. In general, cooling water temperature Tw tends to rise when the outside air temperature Ta is high (e.g. summertime or the like). The cooling water temperature Tw may be increased by use of the second warm-up mode having a lower load than that of the first warm-up mode when the outside air temperature Ta is equal to or higher than T2 as described above. In such a case, fuel necessary to allow the cooling water temperature Tw to reach T1 can be reduced as compared with the case in which the first warm-up mode is applied. Therefore, fuel consumption resulting from the manual regeneration can be improved.

Incidentally, in each of the flows as described above, the control target during engine load control is only one of the revolution speed N of the engine 1, the displacement volume q and discharge pressure P of the hydraulic pump 11 in all the three modes (the first warm-up mode, the second warm-up mode and the exhaust temperature rise mode). However, in view of simplification of a series of control, it is preferable that the load control section 66 may be configured to control the same control target in all the three modes. Specifically, it is preferable that, for example, only the revolution speed N of the engine 1 be set as the control target in all the three modes and be appropriately set to a first target value N1, a second target value N2 or a third target value N3 in accordance with situations. As the control target is limited to one as mentioned above, the control is further simplified, which can further facilitate mounting on a real machine.

What is claimed is:

1. A working machine comprising:
a diesel engine;
a variable displacement hydraulic pump driven by the diesel engine;
exhaust gas treatment equipment having a filter capturing particulate matter in the exhaust gas of the engine;
a cooling water temperature sensor that detects cooling water temperature of the engine; and
a controller configured to increase at least one of revolution speed N of the engine, displacement volume q and discharge pressure P of the hydraulic pump from a state at low-idle time to increase an engine load, to compulsorily regenerate the filter by allowing fuel to stay in the exhaust gas of the engine to compulsorily elevate exhaust temperature and to instruct the controller to start the compulsory regeneration; and
wherein the controller is further configured to keep, after the instruction is given to start the compulsory regeneration and when the cooling water temperature is lower than flame-out prevention temperature T1 set to prevent occurrence of flame-out during the compulsory regeneration, at least one of the revolution speed N of the engine, the displacement volume q and discharge pressure P of the hydraulic pressure pump at a corresponding first target value (N1, q1, or P1) set to allow the cooling water temperature to reach the flame-out prevention temperature T1 or higher,
wherein the controller is further configured to keep, after the instruction is given to start the compulsory regeneration and when the cooling water temperature is equal to or higher than the flame-out prevention temperature T1, at least one of the revolution speed N of the engine, the displacement volume q and discharge pressure P of the hydraulic pressure pump at a corresponding second target value (N2, q2, or P2) that is a target value set to keep exhaust temperature at which the compulsory regeneration is possible and that is set lower than the first target value, and wherein the controller is further configured to start the compulsory regeneration after the instruction is given to start the compulsory regeneration and when the cooling water temperature is equal to or higher than the flame-out prevention temperature T1.

2. The working machine according to claim 1, wherein the controller is further configured to determine whether or not the compulsory regeneration of the filter is completed, and if the controller determines that the compulsory regeneration is completed after the compulsory regeneration has been started, then the controller is configured to finish the compulsory regeneration.

3. The working machine according to claim 2, further comprising:

an exhaust temperature sensor that detects exhaust temperature of the engine immediately before exhaust gas is introduced into the filter, and wherein the controller is configured to measure the time during which exhaust temperature detected by the exhaust temperature sensor is kept in a compulsory regenerable range and further to determine that the compulsory regeneration is completed when the measured time reaches regeneration completion time set to determine regeneration completion timing of the filter.

4. The working machine according to claim 1, further comprising:

an outside air temperature sensor that detects outside air temperature, and wherein when the outside air temperature is equal to or higher than a preset temperature set to suppress fuel consumption along with a load rise, and when the cooling water temperature is lower than the flame-out prevention temperature T1 after the instruction has been given by the controller to start the compulsory regeneration, the controller is further configured to keep at least one of the revolution speed N of the engine, the displacement volume q and discharge pressure P of the hydraulic pressure pump at a corresponding third target value (N3, q3, or P3) that is a target value set to allow the cooling water temperature to reach the flame-out prevention temperature T1 or higher and that is set lower than the first target value and equal to or higher than the second target value.

5. The working machine according to claim 1, further comprising:

a lock device that makes it impossible for an operator to operate the working machine when the lock device is at a lock position, and wherein the controller is further configured to exercise load control and compulsory regeneration, respectively, when the lock device is at the lock position.

6. The working machine according to claim 2, further comprising:

an outside air temperature sensor that detects outside air temperature, and wherein when the outside air temperature is equal to or higher than a preset temperature set to suppress fuel consumption along with a load rise, and when the cooling water temperature is lower than the flame-out prevention temperature T1 after the instruction has been given by the controller to start the compulsory regeneration, the the controller is further configured to keep at least one of the revolution speed N of the engine, the displacement volume q and discharge pressure P of the hydraulic pressure pump at a corresponding third target value (N3, q3, or P3) that is a target value set to allow the cooling water temperature to reach the flame-out prevention temperature T1 or higher and that is set lower than the first target value and equal to or higher than the second target value.

7. The working machine according to claim 3, further comprising:

an outside air temperature sensor that detects outside air temperature, and wherein when the outside air temperature is equal to or higher than a preset temperature set to suppress fuel consumption along with a load rise, and when the cooling water temperature is lower than the flame-out prevention temperature T1 after the instruction has been given by the controller to start the compulsory regeneration, the the controller is further configured to keep at least one of the revolution speed N of the engine, the displacement volume q and discharge pressure P of the hydraulic pressure pump at a corresponding third target value (N3, q3, or P3) that is a target value set to allow the cooling water temperature to reach the flame-out prevention temperature T1 or higher and that is set lower than the first target value and equal to or higher than the second target value.

8. The working machine according to claim 2, further comprising:

a lock device that makes it impossible for an operator to operate the working machine when the lock device is in a lock position, and wherein the the controller is further configured to exercise load control and compulsory regeneration, respectively, when the lock device is in the lock position.

9. The working machine according to claim 3, further comprising:

a lock device that makes it impossible for an operator to operate the working machine when the lock device is in a lock position, and wherein the controller is further configured to exercise load control and compulsory regeneration, respectively, when the lock device is in the lock position.

10. The working machine according to claim 4, further comprising:

a lock device that makes it impossible for an operator to operate the working machine when the lock device is in a lock position, and wherein the controller is further configured to exercise load control and compulsory regeneration, respectively, when the lock device is in the lock position.

* * * * *